United States Patent [19]
Gibb

[11] 3,869,831
[45] Mar. 11, 1975

[54] FLEXIBLE FOAM MATERIAL SHAPER
[75] Inventor: John F. Gibb, Englewood, Calif.
[73] Assignee: Backer Rod Mfg. & Supply Co., Denver, Colo.
[22] Filed: Sept. 4, 1973
[21] Appl. No.: 393,827

[52] U.S. Cl............. 51/75, 51/327, 264/147, 425/294
[51] Int. Cl............. B24b 9/02, B29h 7/18
[58] Field of Search......... 51/74, 75, 327; 83/9, 51, 83/407, 505, 441, 444; 425/294; 264/146, 147; 156/138, 142, 259, 510; 242/56.2, 56.3

[56] References Cited
UNITED STATES PATENTS
2,414,739 1/1947 Heygel........................ 242/56.3 X
3,350,816 11/1967 Breeding........................ 51/80 A
3,750,973 8/1973 Walters........................ 242/56.2

Primary Examiner—Al Lawrence Smith
Assistant Examiner—Nicholas P. Godici
Attorney, Agent, or Firm—Richard D. Law

[57] ABSTRACT

Sheet foam (usually synthetic, flexible, foam plastic) is cut into a plurality of strands of uniform cross-sectional dimensions in a two stage operation by securing the sheet foam to a backing roller by a first pair of spaced-apart holding or pinching rollers and a first cutter mounted between the first holding rollers to cut part way through the sheet, and then securing the partially cut sheet to a second backing roller by a second pair of spaced apart holding rollers with a second cutter roller cutting the opposite or uncut side of the sheet between the second holding rollers. The holding rollers are positioned closely adjacent to the cutting rollers to secure the soft foam plastic in position for accurate cuts at high speed production rates. Take-up means between the first and second cutters maintains uniform rate of travel of sheet through the cutters and a uniform tension on the sheet therein.

14 Claims, 12 Drawing Figures

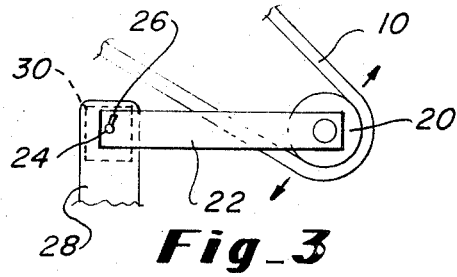
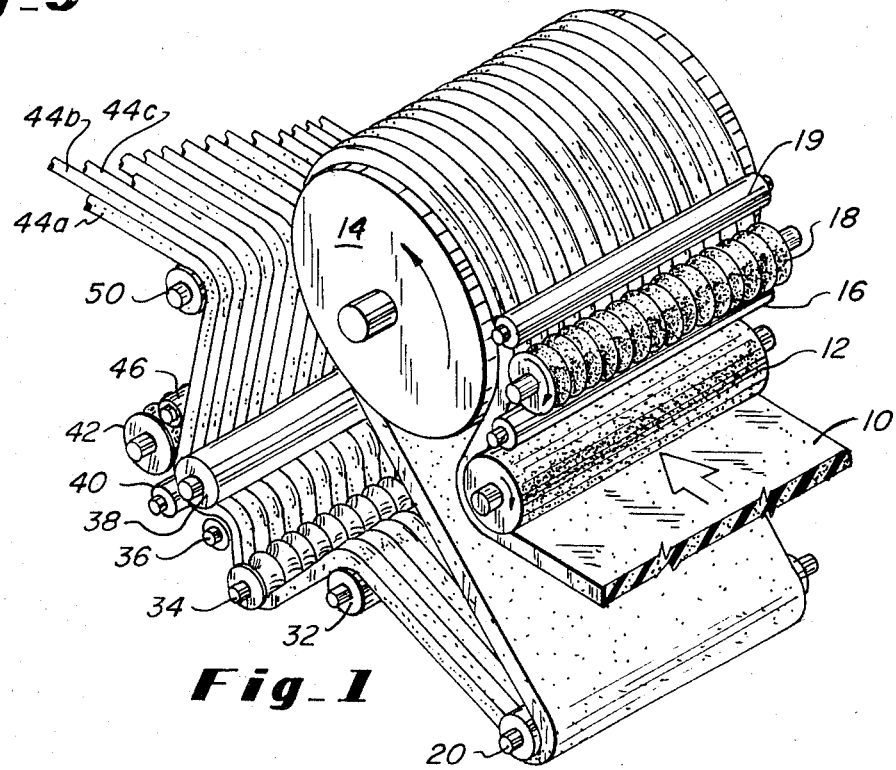
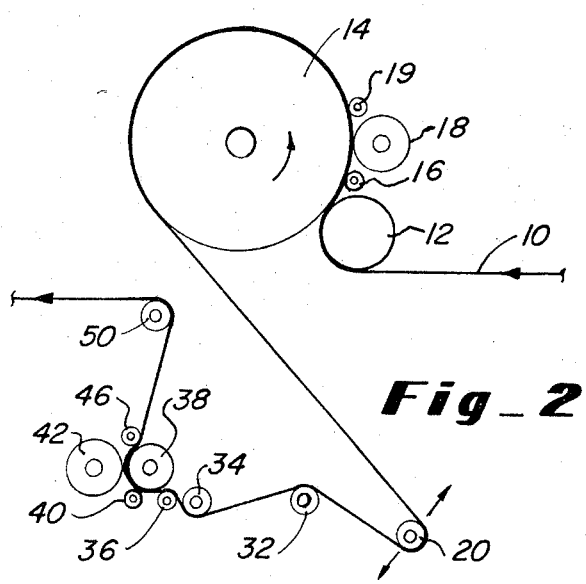

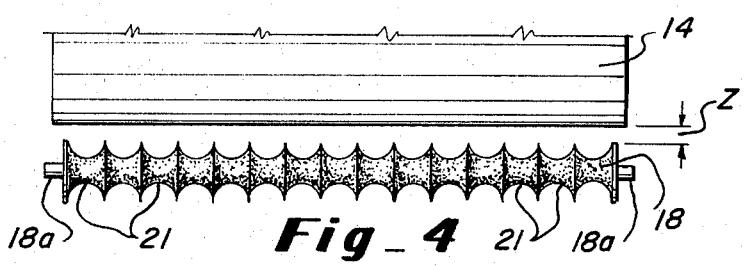
Fig_4
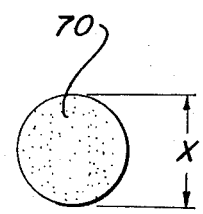
Fig_9
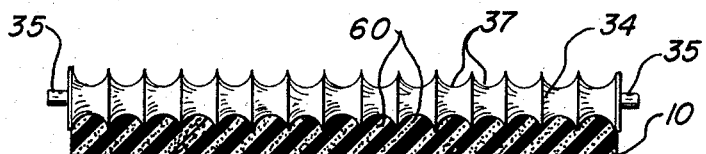
Fig_5
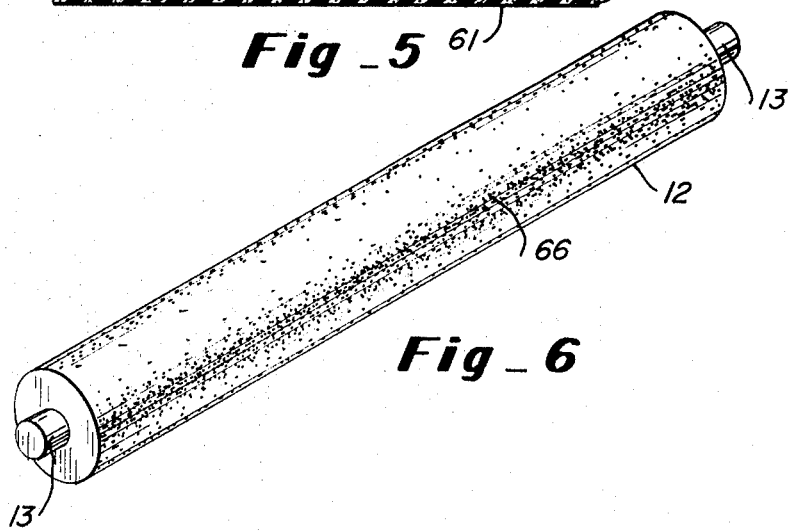
Fig_6
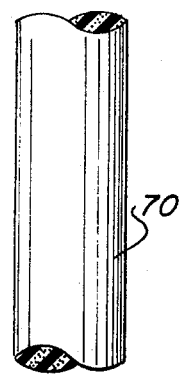
Fig_10
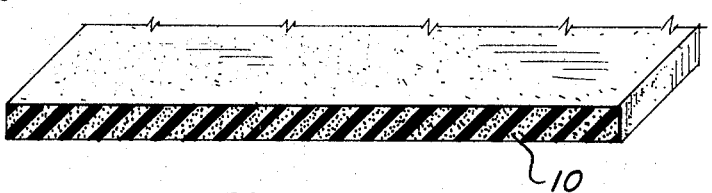
Fig_7
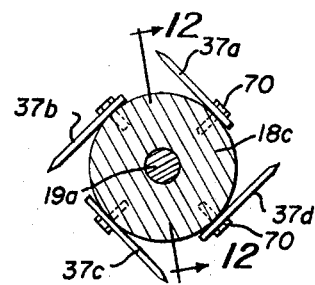
Fig_11
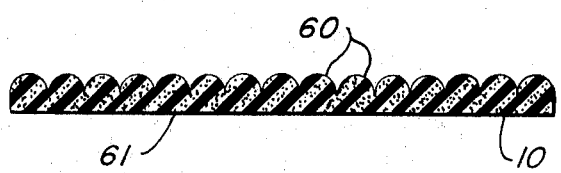
Fig_8
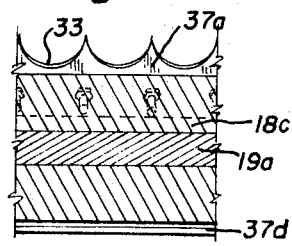
Fig_12

FLEXIBLE FOAM MATERIAL SHAPER

GENERAL STATEMENT OF THE INVENTION

This invention relates to apparatus and a method for accurately cutting sheets of soft, flexible foam into uniform cross-sectional individual strands of the material at high production speeds. The subject matter of this application is set out in Disclosure Document No 010,238 dated Apr. 17, 1972.

BACKGROUND OF THE INVENTION

Flexible, soft foamed synthetic resins, particularly the open cell foam type, are difficult to cut into long continuous lengths of individual strands of substantially uniform cross section from sheets and blocks of the foam material. The individual strands may be circular, such as used for backer rod, square or rectangular for sealing strips, hexagonal, or other cross-sectional configurations for various purposes. Further, the strips may be backed by paper or cloth and the paper or cloth may be coated with an adhesive for forming taping strips of the foam plastic.

In some instances, the foamed synthetic plastic elongated shapes have been extruded with the foaming occurring at the time the plastic is extruded. However, this invariably leaves a dense skin on the shape which traps the blowing gas in the closed cells of the shape, particularly adjacent to the skin of the shape. Further, the skin exhibits physical characteristics which are not similar to the characteristics of the foam shapes without the skin. It is additionally difficult to extrude a shape with a backing and to provide uniform cross-section along its length. For many purposes, it is highly desirable to have a foam shape with completely open cells around the periphery of the shape and through its mass, much like a sponge.

In the past, several processes and apparatus have been proposed for producing different shapes from a sheet of foam synthetic plastic; however, these have not been satisfactory for the modern, very soft, open cell foams currently on the market. In one prior art process, described in U.S. Pat. No. 3,009,848, for "Elastic Foam Article and Apparatus for Making the Same," issued Nov. 21, 1961, a sheet or block of soft foam plastic is compressed before it is inserted between two juxtaposed cutters revolving in opposite directions and in the direction of the moving block. The cutters simultaneously preform two cuts which are arranged in a zigzag cut, producing a wider, thinner piece of the foam plastic sheet when laid out laterally.

In another method of treating foam plastic, set out in U.S. Pat. No. 3,123,656, issued Mar. 3, 1964, for "Method for Finishing Shaping Foam Plastic," juxtaposed grooved rollers forming a die throat only slightly larger than the original foam plastic shape, are heated above the melting point of the plastic. The rollers rotate in the direction of the moving plastic, which passes through the heated rollers, and the plastic is shrunk to only slightly smaller cross-sectional dimensions than the original plastic shape. In both of these patents, two juxtaposed rollers are arranged to simultaneously operate on both sides of a sheet of foam plastic.

Experience has shown that soft, flexible foam synthetic plastic, e.g., flexible foamed polyurethane, flexible foamed polyethylene, etc., is very difficult to cut to accurate specifications, and it is extremely difficult to cut at high production rates. Such foams, normally open cell foams, have the ability to easily stretch, compress, elongate and move from side to side, even when lightly contacted by a cutter. Such foams are of very low density and are easily distorted or moved from a fixed position. The two juxtaposed cutters of U.S. Pat. No. 3,009,848 are not at all satisfactory for two simultaneous cutting operations to form such sheets into plural strands of a predetermined cross-section, since the cutters tend to pull and elongate the material as it contacts the cutters. Obviously, the cutters must rotate at a considerably higher rate of speed than the movement of plastic through the cutters, and, therefore, the cutters tend to pull the plastic and stretch it as it enters the cutters. Such pulling and stretching is not uniform and non-uniform cross-sectional strands are produced when such juxtaposed cutters are used. In any situation, when the foam is compressed or stretched as it enters the cutter it cannot be cut uniformly while passing through the cutters, and the resultant product is of non-uniform cross-sectional dimensions.

GENERAL DESCRIPTION OF THE INVENTION

The process of the invention includes securing a sheet of moving foam plastic to drive roller by two closely spaced apart pinch rollers and partially cutting through the sheet by a rotary cutter mounted between the pinch rollers. When desired, the sheet material is reversed over another smaller drive roller and is secured thereon by two closely spaced apart pinch rollers with a second cut produced on the side of the sheet opposite the first cut by a second cutter mounted between the second pinch rollers. The sheet material is driven at a constant speed through the first cutter and a variable speed through the second cutter to provide uniform tension of the sheet in the unit to produce a uniform cross sectional dimension of the strands of the flexible foam material cut from the sheet.

The apparatus of the invention includes a first, relatively large diameter drive roll and a pair of closely spaced pinch rollers pressing and securing the foam plastic material to the rollers, and a rotary cutter positioned between the two spaced pinch rollers. A second drive roller, of smaller diameter than the first drive roller, is provided with two spaced apart pinch rollers with a second cutter positioned between the two second pinch rollers. Between the two drive rollers is mounted a movable idler which is arranged to vary the rate of rotation of one of the drive rollers to maintain proper tension between the two rollers and to maintain a proper rate of travel of the foam sheet in the cutters of the unit. The pinch rollers somewhat compress the material, holding it firmly on the drive rollers, and most important it secures the foam material to the drive roller under the cutter with a minimum of length therebetween so as to reduce the tendency of movement, elongation or compression of the sheet material. The upstream pinch rollers meter the material to the following cutter, and the downstream pinch rollers remove the cut material from the cutter which prevents bunching of the material at the cutters and thereby reduces the accuracy of the cut. A guide roller provides means for accurately positioning the partially cut material into the second cutter to assure uniform cross-sectional dimensions of all the strands cut from the sheet material.

In general, the material is formed into an elongated sheet which is of a thickness necessary to produce the desired cross-sectional dimension in that direction and of a width to produce a plurality of individual strands of desired cross-sectional dimensions in the direction normal to the first said direction. Round cross-sectional configuration strands are effectively cut from rectangular stock and these may be used as "backer rods" for supporting caulking and the like between various construction members. Forming round rod may be accomplished with a theoretical loss of about 22 percent of material which does not go into the rods themselves. Other shapes may be formed with more or less theoretical loss of material in the cutting.

Generally, long stretches of the sheet material is wound on a spool and is fed from the spool directly into the cutting machine. The produced individual strands may, also, be simultaneously wound on a spool subsequent to the cutting procedure, and then wound into individual packages from the common spool.

GENERAL DESCRIPTION OF THE DRAWINGS

FIG. 1 is a perspective, somewhat schematic, view of a cutting machine according to the invention;

FIG. 2 is a schematic side elevation of the cutting machine of the invention, showing the relation of the rolls and cutters and the path of the sheet material therethrough;

FIG. 3 is a detailed enlarged view of an idler roll for sheet material take-up during cutting operations;

FIG. 4 is a partial detailed view of a cutter juxtaposed with a drive roller according to the invention;

FIG. 5 is a detail view of a guide roll arranged in guiding position on a sheet of foam plastic;

FIG. 6 is a perspective view of a drive or pull roller showing a surface configuration of the roller;

FIG. 7 is a cross-sectional view of a section of rectangular shape, foamed plastic;

FIG. 8 is a cross-sectional view of a sheet of foam plastic after passing one particular type of cutter in which one-half of the material is cut;

FIG. 9 is an end view of a circular strand of foam plastic material;

FIG. 10 is a side elevational view of a portion of a circular foam rod;

FIG. 11 is a cross sectional view of a modified form of cutter; and

FIG. 12 is a side-elevational view, in section along line 12—12 of the device of FIG. 11.

SPECIFIC DESCRIPTION OF THE DRAWINGS

In the device selected for illustration in FIG. 1, a sheet of foamed plastic 10 is delivered from a feed spool, not shown, to a pull roll 12. The material 10 passes under the pull roll 12 onto a drive roll 14. The pull roll 12 is juxtaposed with the drive roll 14 so as to partially compress the uncut foam sheet therebetween and insure that it is tightly held on the drive roll 14. The sheet material then passes under a first pinch roll 16 which is upstream from a cutter 18, described in detail below. Partially cut foam (cut on one side) then passes under a second pinch roll 19 positioned downstream of the cutter 18. The pinch rolls 16 and 19 are closely spaced so as to provide a minimum expanse of foam plastic therebetween, but sufficient to permit the cutter 18 to cut part way through the foamed plastic. The upstream pinch roll 16 further holds the foam to the drive roll 14, and it acts as a metering device to eliminate or minimize any stretching or movement of the foam due to the cutting action of the cutter. The direction of rotation of the cutter (same direction as the movement of the sheet) has a tendency to pull the foam away from the pinch roll at a rate faster than the rotation of the drive roll 14. This causes a tendency to bunch up the partially cut foam downstream of the cutter which can result in the foam being cut off and/or changing the desired cross-sectional dimensions of the cut. This tendency to bunch up is prevented by the downstream pinch roll 19 which is located just downstream from the cutter 18. The pinch roll 19 therefore secures the partially cut foam to the drive roll, holding it away from the cutter so as to prevent the foam from being further cut and removing more material intended by the cutters.

The foam sheet, now partially cut, extends around the drive roll 14 and is passed over a movable idler roll 20. This roll is shown in detail in FIG. 3, wherein the roll 20 is mounted on a pair of arms 22 which are pivotally mounted on a rotatable shaft 24. The arms 22 are secured by means of a set screw 26 to the shaft 24 so that the shaft pivots as the arms 22 pivot in relation to shaft support uprights 28. A voltage controller 30, such as a transformer, or the like, is secured to the shaft 24. This provides for varying voltage passing through the transformer to the motor for the first or second drive roll, explained below, to provide passage of the foam under uniform tension through the cutting unit.

The partially cut foam sheet 10 after passing the movable idler 20, passes over an idler roll 32, under a guide roll 34 and over a pinch roll 36. The guide roll is provided with a configuration to mate with the configuration of the cut from the cutter 18, explained for FIG. 5 below. This roll is arranged for controlled lateral movement to insure an accurate line between the partially cut foam and the second cutter mounted downstream on a second drive roll. This foam, after passing the guide roll 34, contacts a second drive roll 38 and it is secured to the drive roll 38 by means of a pinch roll 36. Another, following pinch roll 40 holds the sheet to the roll 38. A second cutter 42 is arranged to cut through the partially cut foam, immediately following pinch roll 40, to produce a series of individual strands 44a, 44b, 44c, etc. The individual strands, after being cut from the sheet, are held to the drive roll 38 by means of another pinch roll 46 which is mounted so as to prevent the foam material from bunching up after being cut. The cut strands then pass over an idler 50 to a supply spool, not shown, which is driven at a rate to wind the individual strands on the spool. The pinch rolls compress the sheet material against the drive roll and the upstream roll meters the partially cut sheet to the cutter, while the downstream roll removes the strands to prevent bunching. The roll 36 insures a smooth feed to pinch roll 40.

As illustrated in FIG. 4, the cutter roll 18 mounted on a shaft 18a, which is journaled in bearings and supports, not shown, is juxtaposed with the drive roll 14 a distance indicated by the letter Z. This distance is determined by the thickness of the foam plastic and provides a means for securing the foam plastic on the roll 14 for conjoint movement with no slippage. The cutter 18 is of generally cylindrical form mounted on the shaft 18a with the spool-shaped portions 21 extending along the roll. This provides for forming a half of a cut of a round rod from the plastic, for example. The cutters may be of a shaped-knife type or abrasive covered as may be desired. The shaped-knife type may be a series of knife blades mounted either as individual cutting edges attached in a suitable fashion to the shaft 18a, or they may be long blades positioned to cut many shapes at a time, which long blades would be attached to the shaft. With foamed plastic, excellent results are obtained by using high cutting speeds, usually a surface speed of the cutter in excess of 5,000 feet per minute. For soft foams, a cutter may be made by forming the cutter in the shape shown in FIG. 4 and coating the surface with an abrasive material. For instance, silicon carbide or aluminum oxide grits may be fixed to the surface of the cutter drum by adequate adhesives. One good adhesive for the purpose is an epoxy thermosetting resin. A number 60 grit is very good for cutting the foam plastic; however, other sizes may be used. In general, the coarser the grit the faster the cutting is produced, however, the cut is rougher. On the other hand, the finer the grit, the smoother cut is achieved. As the cutter rotates against the foam, it produces fine particles of the foam. Adequate ventilation and preferably a suction system is provided for keeping the cutter unit clean. The surface of the drive rolls may, also, be covered with a grit to provide a secure holding of the foam on its surface. For example, as shown in FIG. 6, a roll of cylindrical shape, having a shaft 13, is coated with grit 66. The grit aids in securely holding the sheet material on the surface without slippage between the sheet and the roll. The drive rolls may, likewise, be covered with grit if desired. The drive roll 14 may be driven in the direction indicated by belts, chains, gears or other types of drive generally hooked up to a gear motor of the like and either with a fixed speed or a variable speed control. By driving the drum 14, the foam may be pulled past the cutter instead of pushing it into the cutter. It has been found that pushing the foam into a rotary cutter results in more frequent problems than by pulling the plastic foam through the cutter.

the guide roll 34, FIG. 5, is mounted on a shaft 35 which is journalled in bearings and supports, now shown. The guide roll 34 has essentially the same shape as the cutter 18, including the cut-out portions 37 which mate with the cut made by the cutters on the plastic. As shown, the palstic sheet 10, after having been cut by the cutter 18, includes a series of undulations 60 on one surface leaving a planar surface 61 on the other side. The undulations 60 mate with the arcuate portions 37 of the cutter. The roll 35 is arranged for lateral adjustment so as to move the plastic sheet into exact alignment with the second cutter, for producing precise individual strands of a uniform cross-section.

The roll 12, FIG. 6, is mounted on a shaft 13 for normally free rotation. However, in some instances, it may be desired to drive the roll 12 which must then have its speed coordinated with the drum 14 to provide for movement of the foam plastic therebetween without stretching or compressing. The roll 12 should be arranged for movement toward and away from the roll 14 for varying the compression on the plastic foam going through the bight between the two members.

As shown in FIG. 7, a foam plastic sheet is of rectangular cross-section dimensions and of a length as desired. By passing through the cutter 18, FIG. 4, a configuration as shown in FIG. 8 is provided. By passing through the second cutter, a series of round strands 70 are produced as shown in FIGS. 9 and 10. The diameter X of the rods is determined by the size of plastic sheet and by the size of the cutters.

As the partially cut foam leaves the drive drum 14, it passes around a movable idler 20 which is mounted on pivotal arms as explained above. The pivotal arms are used to control the shaft, on which is mounted a transformer or other voltage regulator to vary the power to a variable gear motor, not shown, for driving the drive roll 38. Depending upon the loop of foam plastic between the drum 14 and the idler 32, the position of the movable idler 20 is determined. When this movable roll 20 moves down, it increases the current to the motor driving the drive roll 38, speeding it up and thereby resulting in a faster feed between the drive roll and cutter and pulls the loop back to normal position. The opposite happens if the movable roll moves up, thereby slowing down the drive roll 38 and permitting a longer loop to result.

A modified cutter is shown in FIGS. 11 and 12, wherein the cutter uses cutting blades instead of the grit. Thus, a roll 18c mounted on shaft 19a has blades 37a, 37b, 37c and 37d bolted (or otherwise secured) to it by bolts 70. The cutters have a serrated edge 33 arranged to cut approximately one-half of the plastic final shape. This is similar to the grit cutters.

In actual operation with the flexible foam, it has been shown that due to the stretching or elastomeric nature of the material, the best results are achieved in the final product where one drive roll is driven at a fixed speed and the second at a variable speed. The rotation of the variable speed roller is controlled by the movable idler, and either the roll 14 or the roll 38 may be variably controlled.

In many cases with the flexible foamed plastic, it has been found that the diameter of the drive roll 38 should be approximately the same diameter as the cutter 42 while the drive roll 14 should be considerably larger than the diameter of the second drive roll 38. One of the reasons for this is that as the final cut is made, sufficient material has been removed so that the foam is substantially weakened. The rotation of the cutter against the foam causes the rough grit covered cutting surfaces to pull the weaker foam toward the cutters, stretching the now severed strands and eventually cutting them off, particularly upon stopping the feed through the maching. To combat this, it is vital that the foam being cut go through a much shorter radius turn so that it is fed to the cutter and immediately thereafter is directed away from the cutter and the supporting drive roll, to prevent the lifting action away from the drive roll into the cutter 42. The pinch roll 46 aids in holding the strands from the cutters.

It has been found that the direction of rotation of the cutter must be in the direction of movement of the foamed plastic. The rotation of the cutters cannot be reversed and obtain satisfactory results. The high speed, grit covered rolls accurately cut the flexible soft foam which is securely held, with a minimum stretch, between the two pinch rollers holding the foam against the drive rolls.

In some cases, only one side of the sheet foam will require cutting. In cases like this, the entire cutting requirements may be done by a single cutter. As the foam leaves the drum 14, for example, the sheet may be passed under the idler 50 and onto a product drum. A specific case in point is that with the foam covered on one side with a paper which is bonded in some suitable manner. In either case, whether the foam is partially cut or completely cut through the sheet, the cutters provide accurate cutting and produce a uniform cross-section product.

It is noted that the sheet material is wrapped around a substantial portion of the periphery of the upstream drive roll 14, on the order of one-half to over about three-quarters to provide good holding of the material in the upstream cutter section. This provides control of the sheet material passing through the upstream and downstream cutter sections. As pointed out above, once the strands are separated, it is important to remove the strands from the cutter, and thus only about half the periphery of the downstream drive roll is contacted by the strands and the partially shaped sheet material. The controlled differential rotational speeds between the upstream and downstream drive rolls insures no undue longitudinal stress in the sheet material tending to cause slippage between the sheet material and the rolls, and/or elongation or bunching of the sheet material passing through the unit.

I claim:

1. Apparatus for shaping at least one surface of soft, flexible foamed sheet material, comprising:
    a. at least one cylindrical drive roll means having a peripheral surface for passing an elongated sheet around and in contact with a substantial portion thereof,
    b. cylindrical roll means juxtaposed with said drive roll means for compressing said sheet material against said drive roll means at about its first contact with said drive roll means,
    c. a pair of closely spaced pinch roll means juxtaposed with said drive roll means adjacent to and downstream from said cylindrical roll means arranged for pressing said sheet material into contact with said drive roll means passing therebetween, and
    d. high speed rotary cutter means juxtaposed with said drive roll means mounted between said pair of pinch roll means and rotating in the direction of travel of said sheet material arranged to shape said at least one side of said sheet material while it is in contact with said drum roll means, said rotary cutter means being shaped to provide corresponding cut in one surface of said sheet material.

2. Apparatus according to claim 1 wherein said surfaces of said cylindrical drive roll are provided with a gripping surface for said sheet material.

3. Apparatus according to claim 1 wherein said cylindrical roll means is driven at a conjoint rate with said driven roll.

4. Apparatus according to claim 1 wherein said rotary cutter includes a grit surface for cutting said sheet material.

5. Apparatus according to claim 1 wherein the upstream said pinch roll means is arranged to meter said sheet material to said cutter means.

6. Apparatus for forming uniform cross-section strands from elongated, soft, flexible, foamed sheet material comprising:
    a. upstream and downstream cutter sections, each arranged to shape one side of such sheet material passing therethrough to form plural strands of material of uniform cross-section,
    b. each said cutter section including a drive roll and a pair of closely spaced pinch rolls juxtaposed with said drive roll to secure said sheet material to said drive roll while passing therearound, and a rotary cutter mounted between said pinch rolls positioned to shape one side of said sheet material,
    c. said upstream cutter section arranged to shape one side of said sheet and the downstream cutter section arranged to shape the opposite side thereof, and
    d. means arranged between said cutter sections for varying the rate of rotation of one of said drive rolls for maintaining uniform travel of said sheet material through both said cutter sections.

7. Apparatus according to claim 6 wherein said upstream drive roll is substantially larger than said downstream drive roll.

8. Apparatus according to claim 6 wherein said upstream drive roll is rotated at a constant speed and said downstream drive roll is rotated at a variable speed.

9. Apparatus according to claim 8 wherein a loop is formed between said upstream and downstream cutter sections and a movable idler mounted in said loop provides means for varying the speed of rotation of one of said drive rolls.

10. Apparatus according to claim 6 wherein said upstream and downstream rolls are covered with grit to provide non-slipping contact with said sheet material.

11. Apparatus according to claim 6 wherein the shape of said cutters is complementary for cutting two sides of predetermined shapes of strands, and are coated with grit for a cutting medium.

12. A process for shaping at least one side of sheets of soft, resilient, foamed material comprising:
    a. passing an elongated sheet of such material onto at least one rotating drive roll,
    b. compressing said sheet material between a compression roll and said drive roll for moving said sheet simultaneously with the surface of said drive roll essentially without slippage therebetween,
    c. passing said sheet material between a pair of closely spaced pinch rolls and said drive roll, said pinch rolls being spaced from said drive roll to compress said sheet material against said drive roll and support said sheet material therebetween and on said drive roll,
    d. rotating a cutter against one surface of said sheet material between said closely spaced pinch rolls for partially cutting said material and thereby shaping one side of said sheet,
    e. passing said partially cut material substantially around said drive roll, and
    f. then passing said partially cut sheet material off said drive roll.

13. A process according to claim 12 wherein said sheet material is passed through two rotating drive rolls with one side being shaped on the first such drive roll and the opposite side being shaped on the second such drive roll.

14. A process according to claim 12 wherein said cutters are generally cylindrical with a surface providing about one-half the desired shape, and are rotated at surface speeds in excess of about 5,000 feet per minute.

* * * * *

UNITED STATES PATENT OFFICE
CERTIFICATE OF CORRECTION

PATENT NO. : 3,869,831
DATED : March 11, 1975
INVENTOR(S) : John F. Gibb

It is certified that error appears in the above-identified patent and that said Letters Patent are hereby corrected as shown below:

Change inventor's address from "Englewood, California" to --Englewood, Colorado--.

Signed and sealed this 6th day of May 1975.

(SEAL)
Attest:

RUTH C. MASON
Attesting Officer

C. MARSHALL DANN
Commissioner of Patents
and Trademarks